United States Patent [19]

Brunner

[11] Patent Number: 4,739,980
[45] Date of Patent: Apr. 26, 1988

[54] HYDROMECHANICAL TOOL OR WORKPIECE CLAMPING APPARATUS

[75] Inventor: Rudolf Brunner, Baldham, Fed. Rep. of Germany

[73] Assignee: Heilmeier & Weinlein Fabrik fur Oel-Hydraulik GmbH & Co. KG, Munich, Fed. Rep. of Germany

[21] Appl. No.: 17,611

[22] Filed: Feb. 24, 1987

[30] Foreign Application Priority Data

Feb. 24, 1986 [DE] Fed. Rep. of Germany ....... 3605879

[51] Int. Cl.$^4$ .............................................. B23Q 3/08
[52] U.S. Cl. .............................................. 269/25
[58] Field of Search ................ 269/20, 23, 25, 254 R; 91/451, 452; 92/130 A, 130 B

[56] References Cited

U.S. PATENT DOCUMENTS

Re. 30,828 12/1981 Budzich ................................ 91/451
4,523,516 6/1985 Foster et al. ...................... 92/130 B

FOREIGN PATENT DOCUMENTS 2065506 12/1973 Fed. Rep. of Germany ........ 269/25

Primary Examiner—Robert C. Watson
Attorney, Agent, or Firm—Kinzer, Plyer, Dorn, McEachran & Jambor

[57] ABSTRACT

The invention relates to a hydromechanical tool or workpiece clamping apparatus comprising at least one spring clamping cylinder connected to a release conduit and adapted to be hydraulically operated against a spring force to a release position, a pump connected to said release conduit and operable for a release operation, and a discharge conduit extending from said release conduit to a fluid reservoir and including a discharge control element for discharging the pressurized fluid from said spring clamping cylinder to said reservoir after deenergization of said pump. A known clamping apparatus of this type has a solenoid poppet valve disposed in said discharge conduit and operable to close said discharge conduit for the release operation and to be actuated to a flow-through position and maintained therein for the clamping operation. The solenoid valve is expensive and requires separate control means. In contrast thereto, the invention provides the use of a discharge control element in the form of a simple bypass shutter the flow resistance of which at a constant output flow rate of the pump is greater than the pressure required for overcoming the spring force in a release operation.

4 Claims, 1 Drawing Sheet

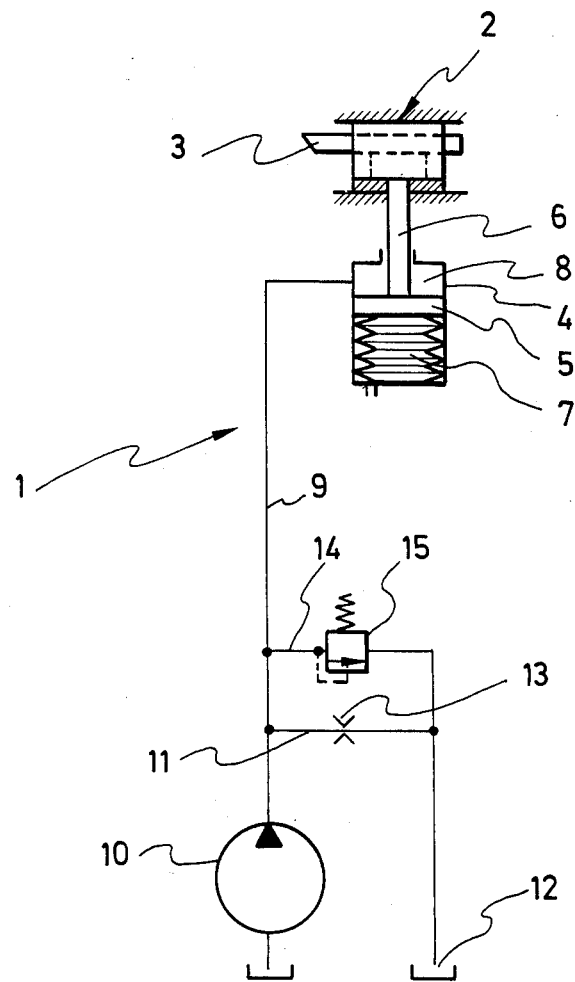

HYDROMECHANICAL TOOL OR WORKPIECE CLAMPING APPARATUS

The present invention relates to a hydromechanical tool or workpiece clamping apparatus of the type defined in the introductory clause of claim 1.

In a generally known clamping apparatus of this type the discharge conduit includes a solenoid-operated poppet valve adapted to close the passage through the discharge conduit for the releasing operation and to open for the clamping operation. The solenoid is operable in its energized state to maintain the poppet valve in the opened state by means for instance of a pressure switch means adjusted to a pressure which is greater than the pressure required for overcoming the spring force. The solenoid valve is expensive and requires specific control components. The described construction also requires the employ of a non-return valve in the release conduit.

It is an object of the present invention to provide a hydromechanical tool or workpiece clamping apparatus of the type defiend above ensuring the same functional reliability with a simplifed construction and control mechanism.

This object is attained according to the invention by the characteristics set forth in the characterizing clause of patent claim 1.

In the construction according to the invention, the solenoid valve and its control mechanism employed in prior art is replaced by a simple and inexpensive bypass shutter capable of functioning without any exterior control. The bypass shutter also requires less installation space. A non-return valve in the release conduit is not either required. For the clamping operation any pressure remaining in the release conduit or the spring clamping cylinder after deenergization of the pump is reduced to zero through the bypass shutter, permitting the spring force to come into full effect. For the release operation the pump is operated to generate the pressure required for overcoming the spring force regardless of the effect of the bypass shutter, as the flow resistance of the latter is greater than the pressure required for overcoming the spring force. During the release operation a part of the pressurized fluid supplied by the pump at a substantially constant flow rate escapes through the bypass shutter, while the remaining part generates the pressure for overcoming the spring force in the spring clamping cylinder. The pressurized fluid escaping through the bypass shutter during the release operation is in practice of no substantial consequence. The insignificant increase of the power consumption of the pump due to the escape of part of the pressurized fluid through the bypass shutter is only a fraction of the expenditure required in the prior art construction for the solenoid valve and its control.

In a particularly simple embodiment the bypass shutter may be adjusted to a fixed setting, such fixedly adjusted bypass shutters being commercially available in different sizes of compact construction.

In another advantageous embodiment the bypass shutter may be adjustable to thereby permit the responsiveness of the apparatus to be altered as desired and to be adapted to any given spring force or size of the spring clamping cylinder, respectively.

In a structurally simple embodiment the bypass shutter is adapted to have shutter inserts of different flow resistance values selectively inserted thereinto, advantageously permitting the apparatus to be adapted to varying conditions in a simple manner.

In any embodiment of the invention an additional discharge conduit parallel to the first-mentioned discharge conduit may include a pressure limiting valve for protecting the hydraulic system from excessive pressure in the conventional manner. A preferred embodiment of the invention shall now be described by way of example with reference to the accompanying anyone drawing diagrammatically showing components of a hydromechanical tool or workpiece clamping apparatus.

A hydromechanical tool or workpiece clamping apparatus 1 diagrammatically shown in the drawing may comprise a clamping body 2 for releasably clamping a tool or workpiece 3 with the aid of a spring clamping cylinder 4. Spring clamping cylinder 4 contains a piston 5 connected to a piston rod 6 extending into clamping body 2. Piston 5 is biased in the clamping direction by a belleville spring stack 7 effective to produce the required clamping force. At the side of piston 5 opposite belleville spring stack 7 spring clamping cylinder 4 forms a chamber 8 communicating with a release conduit 9 adapted to be supplied with a pressurized fluid from a pump 10 having a substantially constant output flow rate when energized for a release operation. A discharge conduit 11 extends from a location of release conduit 9 between pump 10 and spring clamping cylinder 4 towards a fluid reservoir 12. Discharge conduit 11 includes a discharge control element in the form of a bypass shutter 13. Bypass shutter 13 may be adjusted to a fixed flow resistance value; it is also possible, however. to employ an adjustable bypass shutter or a bypass shutter with interchangeable shutter inserts of different flow resistance values.

Advantageously provided is a further discharge conduit 14 extending parallel to discharge conduit 11 from release conduit 9 to reservoir 12 and including a pressure limiting valve 15 for monitoring the system pressure. The hydromechanical tool or workpiece clamping apparatus 1 operates as follows:

For clamping a workpiece or tool 3 pump 10 remains inoperative. Any pressure prevailing in release conduit 9 or in chamber 8 is reduced to zero by escaping through bypass shutter 13. The spring force of belleville spring stack 7 is thus permitted to come into full effect.

For the release operation pump 10 is energized. As the flow resistance or pressure drop, respectively, of bypass shutter 13 is selected to be greater than the pressure required for overcoming the spring force of belleville spring stack 7, the operation of pump 10 results in the required pressure being built up in release conduit 9 for causing piston 5 to compress belleville spring stack 7 and to retract piston rod 6 from clamping body 2, permitting tool or workpiece 3 to be removed. This operation is not influenced by the escape of part of the pressurized fluid through bypass shutter 13. If for any unforeseeable reason the system pressure should rise above a predetermined valaue above the pressure required for the release operation, pressure limiting valve 15 is caused to open to thereby maintain the pressure in release conduit 9 on a predetermined level for protecting the apparatus from damage.

For a subsequent further clamping operation pump 10 is deenergized, whereupon the pressurized fluid escapes from release conduit 9 and chamber 8 of spring clamping cylinder 4 until belleville spring stack 7 again acts to clamp a tool or workpiece 3 by means of piston rod 6.

In a practical embodiment employing a spring clamping cylinder 4 permitting the release operation to be carried out at a pressure of 80 bar, a hydraulic pump 10 having an output flow rate of 1 1/min has been found to be suitable, bypass shutter 13 in this case having a diameter of 0.5 mm, and pressure limiting valve 15 being adjusted to a pressure limit of 100 bar.

The clamping apparatus is operable in a simple manner by merely energizing and deenergizing the pump for the releasing and clamping operation, respectively, with requiring any additional control.

I claim:

1. A hydromechanical tool or workpiece clamping apparatus, particularly for a machine tool, comprising at least one spring clamping cylinder (4) connected to a release conduit (9) and adapted to be actuated to a release position against a spring force, a pump (10) adapted to be energized for the release operation for producing a substantially constant output flow rate in said release conduit (9), a discharge conduit (11) extending between a location of said release conduit (9) between said pump (10) and said spring clamping cylinder (4) and a fluid reservoir (12), and a discharge control element (13) disposed in said discharge conduit (11) permitting the pressurized fluid to escape from said spring clamping cylinder (4) to said reservoir (12) on deenergization of said pump (10) for a clamping operation, characterized in that said discharge control element (13) is a bypass shutter the flow resistance of which at said constant output flow rate of said pump (10) is set to be greater than the pressure required for overcoming the spring force during the release operation.

2. A hydromechanical tool or workpiece clamping apparatus according to claim 1, characterised in that said bypass shutter is adjusted to a fixed setting.

3. A hydromechanical tool or workpiece clamping apparatus according to claim 1, characterized in that said bypass shutter is designed as an adjustable shutter.

4. A hydromechanical tool or workpiece clamping apparatus, particularly for a machine tool, comprising at least one spring clamping cylinder (4) connected to a release conduit (9) and adapted to be actuated to a release position against a spring force, a pump (10) adapted to be energized for the release operation for producing a substantially constant output flow rate in said release conduit (9), a discharge conduit (11) extending between a location of said release conduit (9) between said pump (10) and said spring clamping cylinder (4) and a fluid reservoir (12), and a discharge control element (13) disposed in said discharge conduit (11) permitting the pressurized fluid to escape from said spring clamping cylinder (4) to said reservoir (12) on deenergization of said pump (10) for a clamping operation, characterized in that said discharge control element (13) is a bypass shutter the flow resistance of which at said constant output flow rate of said pump (10) is greater than the pressure required for overcoming the spring force during the release operation; and further characterized in that an additional discharge conduit (14) extending parallel to said discharge conduit (11) includes a pressure limiting valve (15) the relief pressure of which is greater than the pressure required for overcoming the spring force for the release operation, and also greater than the pressure drop over said bypass shutter.

* * * * *